A. M. JANOFSKY.
TIRE FOR VEHICLE WHEELS.
APPLICATION FILED DEC. 2, 1907.
909,419.
Patented Jan. 12, 1909.
2 SHEETS—SHEET 1.
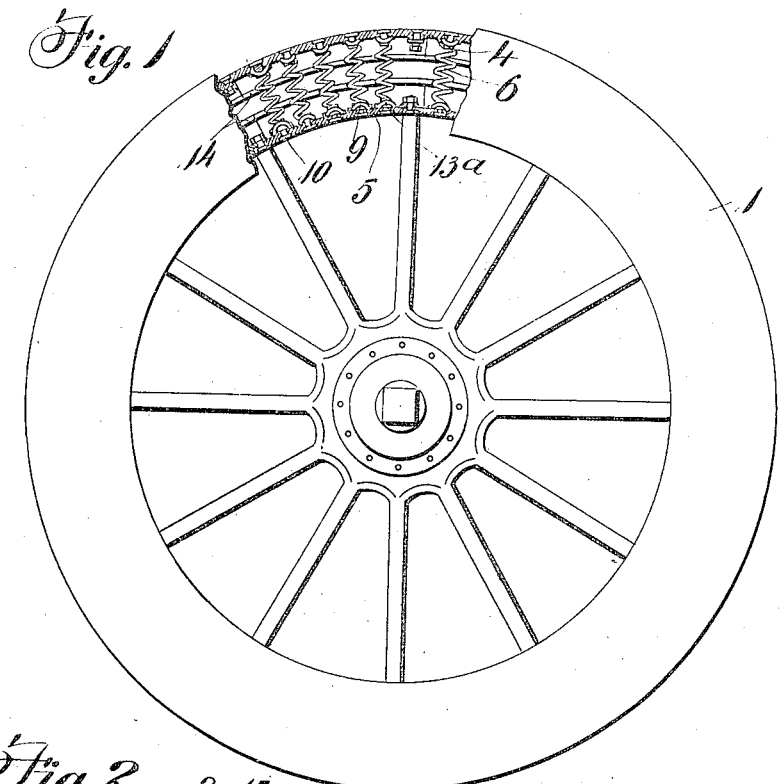
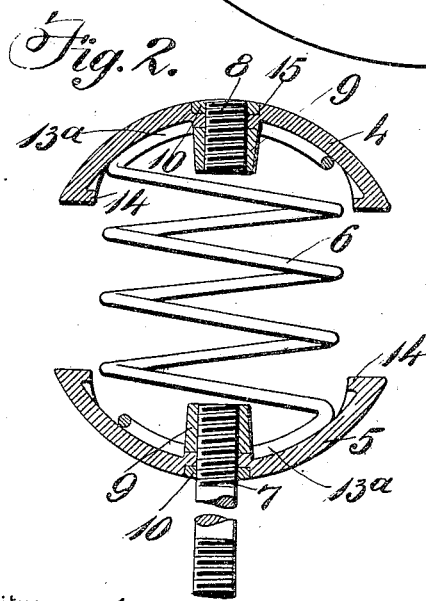

A. M. JANOFSKY.
TIRE FOR VEHICLE WHEELS.
APPLICATION FILED DEC. 2, 1907.
909,419.
Patented Jan. 12, 1909.
2 SHEETS—SHEET 2.
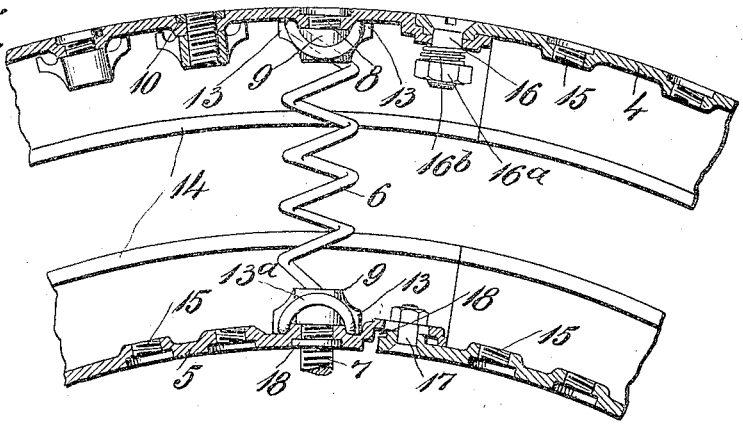
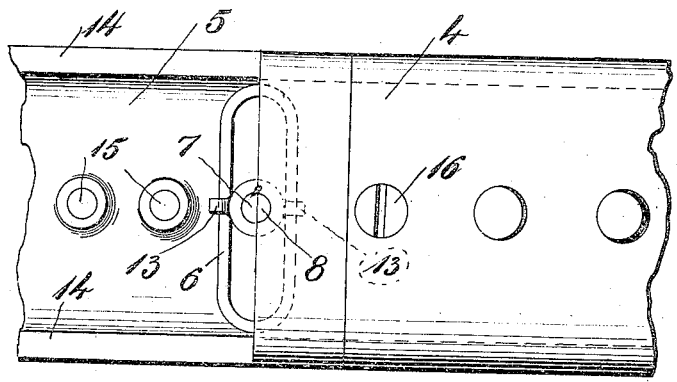
Witnesses
Inventor
Alexander M. Janofsky.
By
Attorneys

UNITED STATES PATENT OFFICE.

ALEXANDER M. JANOFSKY, OF CHICAGO, ILLINOIS, ASSIGNOR OF ONE-THIRD TO ANDREW E. M. JANOFSKY, OF BROOKLYN, NEW YORK.

TIRE FOR VEHICLE-WHEELS.

No. 909,419.  Specification of Letters Patent.  Patented Jan. 12, 1909.

Application filed December 2, 1907. Serial No. 404,754.

*To all whom it may concern:*

Be it known that I, ALEXANDER M. JANOFSKY, citizen of the United States, residing at Chicago, in the county of Cook and State of Illinois, have invented certain new and useful Improvements in Tires for Vehicle-Wheels, of which the following is a specification.

This invention is a tire for vehicle wheels, and in some respects is an improvement on the tire shown in my U. S. Patent, No. 599,060, dated Feb. 15, 1898.

The object of the present invention is to provide an improved spring construction which will act as a substitute for an ordinary inner pneumatic tube and will serve to support or distend an outer tube or cover so that the same will have the requisite resiliency to accomplish the purpose indicated.

A further object of the invention is to form improved means for supporting or holding spiral springs in the tube or cover, said spiral springs being supported between inner and outer segmental plates.

The invention is illustrated in the accompanying drawings, in which—

Figure 1 is a side view of a wheel provided with a tire, partly in section. Fig. 2 is a cross section, the outer tube being removed. Fig. 3 is a longitudinal section of the parts shown in Fig. 2. Fig. 4 is a top view, partly broken away, and with the outer tube removed.

The wheel has an outer rubber tube or cover indicated at 1, which contains the springs and plates to be hereinafter referred to. The segmental plates forming the outer ring are indicated at 4, and those forming the inner ring at 5, and all of these plates are provided with holes 15 through which screws may pass, the spiral springs 6 being located in line with said holes. Said springs are placed or located between the segmental plates, in compression, and accordingly space the same apart to cause the plates to distend the outer tube or cover and form a resilient tire.

The springs may be held in place in various ways. In one form screws 7 and 8 are inserted through the inner and outer segments respectively, and are provided with inner nuts 9 which have ears or wings 13 which engage over the end coils or loops 13ª of the springs 6, said loops being bent to conform to the contour of the inner face of the plates 4 and 5, as shown in Fig. 2. On the other side the screws receive the nuts 10 to hold the same tight, said nuts being sunken in counter-sinks in the plates. At their side edges the plates 4 and 5 are provided with lips 14 which project inwardly and which engage the sides of the coils and prevent said coils from shifting or turning laterally within the plates.

The ends of the inner and outer segmental plates 4 and 5 are lapped and secured together by screws. The outer plates are connected at the lapped ends by screws 16 provided with nuts 16ª and with springs 16ᵇ under the nuts to allow a certain amount of yielding action incident to the compression of the springs of the respective plates. The inner plates 5 are connected by screws 17 at their lapped ends, said screws extending through slots 18 to allow a limited longitudinal slip incident to the movement. The segmental plates are preferably made sufficiently long to accommodate a row of, say, six coils between each pair of plates, as illustrated in Fig. 1.

I claim:

The combination in a tire, of inner and outer concave plates with coiled springs between the same, the plates having inwardly-projecting lips at opposite edges, engaging the springs on opposite sides to prevent side shift thereof, the end coils of the springs being bent to conform to the contour of the plates, and screws extending through the plates and having thereon nuts with hooked wings engaging over said end coils.

In testimony whereof I affix my signature, in presence of two witnesses.

ALEXANDER M. JANOFSKY.

Witnesses:
 H. G. BATCHELOR,
 LOUIS S. WIEMANN.